US006622062B1

United States Patent
Earl et al.

(10) Patent No.: US 6,622,062 B1
(45) Date of Patent: Sep. 16, 2003

(54) METHOD AND APPARATUS FOR FORMING THREE-DIMENSIONAL OBJECTS USING LINE WIDTH COMPENSATION WITH SMALL FEATURES RETENTION

(75) Inventors: Jocelyn M. Earl, Old Headington (GB); Chris R. Manners, Moorpark (GB)

(73) Assignee: 3D Systems, Inc., Valencia, CA (US)

( * ) Notice: Subject to any disclaimer, the term of this patent is extended or adjusted under 35 U.S.C. 154(b) by 0 days.

(21) Appl. No.: 09/484,984

(22) Filed: Jan. 18, 2000

Related U.S. Application Data

(60) Provisional application No. 60/116,281, filed on Jan. 19, 1999.

(51) Int. Cl.[7] ............................................. G06F 19/00

(52) U.S. Cl. ...................... 700/193; 700/119; 700/120; 264/401

(58) Field of Search .................. 700/118–120, 163, 700/176, 175, 186, 187, 193, 178, 182; 264/401, 308; 425/174.4

(56) References Cited

U.S. PATENT DOCUMENTS

| | | | |
|---|---|---|---|
| 4,575,330 A | 3/1986 | Hull .......................... | 425/174.4 |
| 4,752,352 A | 6/1988 | Feygin ........................ | 156/630 |
| 4,863,538 A | 9/1989 | Deckard ...................... | 156/62.2 |
| 4,999,143 A | 3/1991 | Hull et al. ..................... | 264/22 |
| 5,015,312 A | 5/1991 | Kinzie ......................... | 156/63 |
| 5,058,988 A | 10/1991 | Spence ........................ | 356/121 |
| 5,059,021 A | 10/1991 | Spence et al. ............... | 356/121 |
| 5,076,974 A | 12/1991 | Modrek et al. ............... | 264/22 |
| 5,104,592 A | 4/1992 | Hull ............................. | 264/22 |

(List continued on next page.)

FOREIGN PATENT DOCUMENTS

| | | |
|---|---|---|
| WO | 95/18009 | 7/1995 |
| WO | 96/12607 | 5/1996 |
| WO | 96/12608 | 5/1996 |
| WO | 96/12609 | 5/1996 |
| WO | 96/12610 | 5/1996 |
| WO | 97/11835 | 4/1997 |

OTHER PUBLICATIONS

G. Kalmanovich and G. Nisnevich, "Swift and stable polygon growth and broken line offset," Computer Aided Design, vol. 30, No. 11, pp. 847–852, 1998.

R.T. Farouki, et al.; "Path Planning with Offset Curves for Layered Fabrication Processes," Journal of Manufacturing Systems, vol. 14, No. 5, pp. 355–368, 1995.

Jacobs, "Rapid Prototyping & Manufacturing: Fundamentals of StereoLithography," Society of Manufacturing Engineers, 1992, title page.

Jacobs, "Stereolithography and other RP&M Technologies," Society of Manufacturing Engineers, 1996, title page.

Primary Examiner—Albert W. Paladini
Assistant Examiner—Steven R. Garland
(74) Attorney, Agent, or Firm—Ralph D'Alessandro; Dennis Smalley

(57) ABSTRACT

Rapid prototyping and manufacturing (e.g. stereolithography) methods and apparatus are disclosed that form objects with enhanced accuracy and small feature retention. Techniques for offsetting cross-sectional boundary data to at least partially accommodate for solidification width induced in a medium by a beam of radiation are provided. One technique uses repeated small offsets to yield an effective offset of a desired amount. A second technique uses displacement vectors to determine where and to what extent to offset the boundary segments. The offset amount for each vertex is determined based on a combination of the (1) the vertex angle, and (2) a predefined variable offset criteria which is different for at least two predefined ranges of angles. A third technique converts a single boundary segments into a plurality of offset boundary segments when the single boundary segment can not undergo the full desired offset without violating another offsetting rule.

4 Claims, 3 Drawing Sheets

U.S. PATENT DOCUMENTS

| | | | |
|---|---|---|---|
| 5,121,329 A | 6/1992 | Crump | 364/468 |
| 5,123,734 A | 6/1992 | Spence et al. | 356/121 |
| 5,133,987 A | 7/1992 | Spence et al. | 427/53.1 |
| 5,174,931 A | 12/1992 | Almquist et al. | 264/22 |
| 5,182,056 A | 1/1993 | Spence et al. | 264/22 |
| 5,182,715 A | 1/1993 | Vorgitch et al. | 364/474.24 |
| 5,184,307 A | 2/1993 | Hull et al. | 364/474.24 |
| 5,204,055 A | 4/1993 | Sachs et al. | 419/2 |
| 5,209,878 A | 5/1993 | Smalley et al. | 264/22 |
| 5,234,636 A | 8/1993 | Hull et al. | 264/22 |
| 5,238,639 A | 8/1993 | Vinson et al. | 264/22 |
| 5,256,340 A | 10/1993 | Allison et al. | 264/22 |
| 5,321,622 A | 6/1994 | Snead et al. | 364/474.24 |
| 5,597,520 A | 1/1997 | Smalley et al. | 264/401 |
| 5,840,239 A | 11/1998 | Partanen et al. | 264/401 |
| 5,902,537 A | 5/1999 | Almquist et al. | 264/401 |
| 5,943,235 A | 8/1999 | Earl et al. | 364/468.04 |
| 5,945,058 A | 8/1999 | Manners et al. | 264/401 |
| 6,001,297 A | 12/1999 | Partanen et al. | 264/401 |
| 6,399,010 B1 * | 6/2002 | Guertin et al. | 264/401 |
| 6,406,658 B1 * | 6/2002 | Manners et al. | 264/401 |

* cited by examiner

METHOD AND APPARATUS FOR FORMING THREE-DIMENSIONAL OBJECTS USING LINE WIDTH COMPENSATION WITH SMALL FEATURES RETENTION

This application claims priority to provisionally filed application number 60/116,281 filed Jan. 19, 1999.

FIELD OF THE INVENTION

This invention relates to the formation of three-dimensional objects using a Rapid Prototyping and Manufacturing (RP&M) technique (e.g. stereolithography). The invention more particularly relates to the formation of three-dimensional objects using data that has been modified to account for the line width induced in the building material (e.g. photopolymer) by a formation tool (e.g. a laser beam).

BACKGROUND OF THE INVENTION

1. Related Art

Rapid Prototyping and Manufacturing (RP&M) is the name given to a field of technologies that can be used to form three-dimensional objects rapidly and automatically from three-dimensional computer data representing the objects. RP&M can be considered to include three classes of technologies: (1) Stereolithography, (2) Selective Deposition Modeling, and (3) Laminated Object Manufacturing.

The stereolithography class of technologies create three-dimensional objects based on the successive formation of layers of a fluid-like medium adjacent to previously formed layers of medium and the selective solidification of those layers according to cross-sectional data representing successive slices of the three-dimensional object in order to form and adhere laminae (i.e. solidifed layers). One specific stereolithography technology is known simply as stereolithography and uses a liquid medium which is selectively solidified by exposing it to prescribed stimulation. The liquid medium is typically a photopolymer and the prescribed stimulation is typically visible or ultraviolet electromagnetic radiation. The radiation is typically produced by a laser. Liquid-based stereolithography is disclosed in various patents, applications, and publications of which a number are briefly described in the Related Applications section hereafter. Another stereolithography technology is known as Selective Laser Sintering (SLS). SLS is based on the selective solidification of layers of a powdered medium by exposing the layers to infrared electromagnetic radiation to sinter or fuse the particles. SLS is described in U.S. Pat. No. 4,863,538 to Deckard. A third technology is known as Three Dimensional Printing (3DP). 3DP is based on the selective solidification of layers of a powdered medium which are solidified by the selective deposition of a binder thereon. 3DP is described in U.S. Pat. No. 5,204,055 to Sachs.

The present invention is primarily directed to stereolithography using liquid-based building materials (i.e. medium). It is believed, however, that the techniques of the present invention may have application in the other stereolithography technologies for the purposes of enhancing resolution while maintaining aesthetic appeal of the objects being formed.

Selective Deposition Modeling, SDM, involves the build-up of three-dimensional objects by selectively depositing solidifiable material on a lamina-by-lamina basis according to cross-sectional data representing slices of the three-dimensional object. One such technique is called Fused Deposition Modeling, FDM, and involves the extrusion of streams of heated, flowable material which solidify as they are dispensed onto the previously formed laminae of the object. FDM is described in U.S. Pat. No. 5,121,329 to Crump. Another technique is called Ballistic Particle Manufacturing, BPM, which uses a 5-axis, ink-jet dispenser to direct particles of a material onto previously solidified layers of the object. BPM is described in PCT publication numbers WO 96-12607; WO 96-12608; WO 96-12609; and WO 96-12610, all assigned to BPM Technology, Inc. A third technique is called Multijet Modeling, MJM, and involves the selective deposition of droplets of material from multiple ink jet orifices to speed the building process. MJM is described in U.S. Pat. No. 5,943,235 to Earl et al. and U.S. patent application Ser. No. 08/722,335 (both assigned to 3D Systems, Inc. as is the instant application).

Though, as noted above, the techniques of the instant invention are directed primarily to liquid-based stereolithography object formation, it is believed that the techniques may have application in the SDM technologies to enhance object resolution for a given droplet or stream size while still maintaining aesthetic appeal of the objects being formed.

Laminated Object Manufacturing, LOM, techniques involve the formation of three-dimensional objects by the stacking, adhering, and selective cutting of sheets of material, in a selected order, according to the cross-sectional data representing the three-dimensional object to be formed. LOM is described in U.S. Pat. Nos. 4,752,352 to Feygin; and 5,015,312 to Kinzie, and in PCT Publication No. WO 95-18009 to Morita. It is believed that the techniques may have application in the LOM technologies to enhance object resolution when using laser beam or mechanical cutting tool to cutout cross-sections while still maintaining aesthetic appeals of the objects being formed.

Various techniques for compensating for the width of solidification induced by a beam when forming objects using stereolithography have been described previously. In particular various techniques have been described in (1) U.S. Pat. No. 5,184,307 to Hull et al., and 2) U.S. Pat. No. 5,321,622 to Snead et al.

The '307 patent describes techniques for transforming three-dimensional object data into cross-sectional data for use in stereolithographic production of the objects. The derived cross-sectional data is typically divided into one or more groups of vectors. These groups of vectors typically include one or more boundary types (vectors that surround a given portion of a cross-section), one or more fill types that fall within selected boundary regions (sets of vectors that are typically parallel and closely spaced so that upon exposure the entire region is solidified), and one or more hatch types that fall within selected boundary regions (sets of vectors that are typically parallel but may be widely spaced so that some unsolidified material remains between the individually exposed lines). Prior to creating the fill and hatch, this reference teaches that selected boundaries should be offset inward (i.e. toward the object region as opposed to toward a non-object region) by an appropriate amount to account for the solidification width induced by the beam that is used to solidify the material. The offset amount is typically equal to about one half the width of solidification induced by the beam of radiation used to induce solidification.

One technique disclosed in the '307 patent compensates boundaries by:

(1) Forming boundary vectors into loops;
(2) Offsetting each vector into the object by the half a line width; and
(3) Recalculating the endpoints and remove vectors that change orientation.

A second technique disclosed in the '307 patent compensates boundaries by:

(1) Forming boundary vectors into loops, (2) Deriving a displacement vector for each vertex of the boundary loop. The displacement vector should bisect the angle formed by the two boundary vectors that form the vertex. The displacement vector generally has a length equal to $D/[(1-\cos\theta)/2)]^{1/12}$, where D=about ½ the line width, and where $\theta$=angle between the two vectors. This offset amount is used unless the length is greater than a preset maximum amount (e.g. 2*LWC) in which case the length is limited to that preset maximum amount. Furthermore the length of the offset vector was limited to so that it would not extend beyond the midpoint of each of the two boundary vectors giving rise to it as dictated by a perpendicular bisector extending to those each of the two boundary vectors.

A third technique combines benefits of the first two techniques. The boundary vectors are moved inward by the desired amount as in the first technique. If this offset results in a vertex moving in by more than a desired amount an additional vector is added to the compensated boundary. This additional vector extends from (1) the intersection point of the two offset vectors to (2) a point that is a desired distance from the original vertex point.

A fourth technique adds an additional feature to the above techniques by determining whether the offset vectors cross-over one another or over the original vectors. If such a cross-over is determined to exist the offset vertices are backed up to a point where no cross-over occurs or alternatively the region of cross-over may be eliminated. Features can disappear in the three-dimensional object being formed when cross-over occurs.

The '662 patent, as with the '307 patent, is directed to techniques for producing cross-sectional data from three-dimensional object data for use in stereolithography. As with the '307 patent, the '662 patent provides techniques for deriving a plurality of different types of boundaries, hatch, and fill vectors. This patent also teaches various techniques for modifying selected boundary types to produce offset boundaries that are compensated for anticipated width of solidification that will occur during object formation.

A first technique taught in the '662 patent teaches the boundary offsetting by migrating the boundary vertices along angle bisectors by an extent that the shortest distance between the migrated point and the original boundary are equal to the radius of the beam trace. The direction and magnitude of the migration is dictated by a displacement vector.

Excess migration is avoided by several adjustments: (1) Migration is limited to a value equal to two times the radius. (2) The possibility of cross-over is minimized by performing a test compensation equal to twice the desired compensation where a test is performed to see if any original segment has been crossed. If a cross-over is determined, the extent of migration is backed up to a point where the doubled displacement vector just touches the boundary segment. (3) A third test checks for cross-over of displacement vectors and if it occurs, each displacement vector is backed up to the cross-over point. (4) A fourth test determines whether a displacement vector crosses over a compensated boundary segment. If a cross-over is detected, the compensated boundary is moved back toward its original uncompensated segment to such an extent that the cross-over is removed. Alternatively, the displacement vector may also be shortened.

The '662 patent teaches a preferred technique of performing compensation on cross-sectional boundaries prior to dividing the cross-sectional region into down-facing, up-facing, and continuing regions and deriving associated boundaries. It is further taught that alternatives may compensate for solidification width by compensating the region boundaries instead of the original cross-section boundaries. Alternatively, the net compensation of the regions may result from an original compensation of the initial cross-section boundaries plus negative or positive subsequent compensations.

In association with retracting hatch and fill vectors from compensated boundaries, the '662 patent teaches the use of further boundary compensations including the formation of clipping vectors that connect compensated boundary vectors.

Even in view of the teachings of the above noted references, a need remains in the art for improved line width compensation techniques that provide high accuracy boundary placement in combination with retention of small cross-sectional features in the three-dimensional objects being formed from the modified data in an RP&M technique. The retention of small features is desired to enhance the aesthetic appeal and accuracy of the objects formed.

2. Other Related Patents and Applications

The patents, applications, and publications mentioned above and hereafter are all incorporated by reference herein as if set forth in full. Table 1 provides a table of patents and applications co-owned by the assignee of the instant application. A brief description of subject matter found in each patent and application is included in the table to aid the reader in finding specific types of teachings. It is not intended that the incorporation of subject matter be limited to those topics specifically indicated, but instead the incorporation is to include all subject matter found in these applications and patents. The teachings in these incorporated references can be combined with the teachings of the instant application in many ways. For example, the references directed to various data manipulation techniques may be combined with the teachings herein to derive even more useful, modified object data that can be used to more accurately and/or efficiently form objects. As another example, the various apparatus configurations disclosed in these references may be used in conjunction with the novel features of the instant invention.

TABLE 1

Related Patents and Applications

| Patent No. Application No. | Inventor | Subject |
|---|---|---|
| 4,575,330 | Hull | Discloses fundamental elements of stereolithography. |
| 4,999,143 | Hull, et al. | Discloses various removable support structures applicable to stereolithography. |
| 5,058,988 | Spence | Discloses the application of beam profiling techniques useful in stereolithography for determining cure depth and scanning velocity, etc. |

TABLE 1-continued

Related Patents and Applications

| Patent No. Application No. | Inventor | Subject |
| --- | --- | --- |
| 5,059,021 | Spence, et al. | Discloses the utilization of drift correction techniques for eliminating errors in beam positioning resulting from instabilities in the beam scanning system |
| 5,076,974 | Modrek, et al. | Discloses techniques for post processing objects formed by stereolithography. In particular exposure techniques are described that complete the solidification of the building material. Other post processing steps are also disclosed such as steps of filling in or sanding off surface discontinuities. |
| 5,104,592 | Hull | Discloses various techniques for reducing distortion, and particularly curl type distortion, in objects being formed by stereolithography. |
| 5,123,734 | Spence, et al. | Discloses techniques for calibrating a scanning system. In particular techniques for mapping from rotational mirror coordinates to planar target surface coordinates are disclosed |
| 5,133,987 | Spence, et al. | Discloses the use of a stationary mirror located on an optical path between the scanning mirrors and the target surface to fold the optical path in a stereolithography system. |
| 5,174,931 | Almquist, et al. | Discloses various doctor blade configurations for use in forming coatings of medium adjacent to previously solidified laminae. |
| 5,182,056 | Spence, et al. | Discloses the use of multiple wavelengths in the exposure of a stereolithographic medium. |
| 5,182,715 | Vorgitch, et al. | Discloses various elements of a large stereolithographic system. |
| 5,184,307 from app. no. 07/331,644 | Hull, et al. | Discloses a program called Slice and various techniques for converting three-dimensional object data into data descriptive of cross-sections. Disclosed techniques include line width compensation techniques (erosion routines), and object sizing techniques. The application giving rise to this patent included a number of appendices that provide further details regarding stereolithography methods and systems. |
| 5,209,878 | Smalley, et al. | Discloses various techniques for reducing surface discontinuities between successive cross-sections resulting from a layer-by-layer building technique. Disclosed techniques include use of fill layers and meniscus smoothing. |
| 5,234,636 | Hull, et al. | Discloses techniques for reducing surface discontinuities by coating a formed object with a material, heating the material to cause it to become flowable, and allowing surface tension to smooth the coating over the object surface. |
| 5,238,639 | Vinson, et al. | Discloses a technique for minimizing curl distortion by balancing upward curl to downward curl. |
| 5,256,340 and 08/766,956 | Allison, et al. | Discloses various build/exposure styles for forming objects including various techniques for reducing object distortion Disclosed techniques include: (1) building hollow, partially hollow, and solid objects, (2) achieving more uniform cure depth, (3) exposing layers as a series of separated tiles or bullets, (4) using alternate sequencing exposure patterns from layer to layer, (5) using staggered or offset vectors from layer to layer, and (6) using one or more overlapping exposure patterns per layer. |
| 5,321,622 | Snead, et al. | Discloses a computer program known as CSlice which is used to convert three-dimensional object data into cross-sectional data. Disclosed techniques include the use of various Boolean operations in stereolithography. |
| 5,597,520 and 08/428,951 | Smalley, et al. | Discloses various exposure techniques for enhancing object formation accuracy. Disclosed techniques address formation of high resolution objects from building materials that have a Minimum Solidification Depth greater than one layer thickness and/or a Minimum Recoating Depth greater than the desired object resolution. |
| 08/722,335 now abandoned | Thayer, et al. | Discloses build and support styles for use in a Multi-Jet Modeling selective deposition modeling system. |
| 5,943,235 | Earl, et al. | Discloses data manipulation and system control techniques for use in a Multi-Jet Modeling selective deposition modeling system. |
| 5,902,537 | Almquist, et al. | Discloses various recoating techniques for use in stereolithography. Disclosed techniques include 1) an ink jet dispensing device, 2) a fling recoater, 3) a vacuum applicator, 4) a stream recoater, 5) a counter rotating roller recoater, and 6) a technique for deriving sweep extents. |
| 5,840,239 | Partanen, et al. | Discloses the application of solid-state lasers to stereolithography. |

TABLE 1-continued

Related Patents and Applications

| Patent No. Application No. | Inventor | Subject |
| --- | --- | --- |
| 6,001,297 | Partanen, et al. | Discloses the use of a pulsed radiation source for solidifying layers of building material and in particular the ability to limit pulse firing locations to only selected target locations on a surface of the medium. |
| 08/855,125 | Nguyen, et al. | Discloses techniques for interpolating originally supplied cross-sectional data descriptive of a three-dimensional object to produce modified data descriptive of the three-dimensional object including data descriptive of intermediate regions between the originally supplied cross-sections of data. |
| 5,945,058 | Manners, et al. | Discloses techniques for identifying features of partially formed objects. Identifiable features include trapped volumes, effective trapped volumes, and solid features of a specified size. The identified regions can be used in automatically specifying recoating parameters and or exposure parameters. |

The following two books are also incorporated by reference herein as if set forth in full:

(1) *Rapid Prototyping and Manufacturing: Fundamentals of Stereolithography*, by Paul F. Jacobs; published by the Society of Manufacturing Engineers, Dearborn Mich.; 1992; and (2) Stereolithography and other RP&M Technologies: from *Rapid Prototyping to Rapid Tooling*; by Paul F. Jacobs; published by the Society of Manufacturing Engineers, Dearborn Mich.; 1996.

SUMMARY OF THE INVENTION

It is an object of the present invention to provide enhanced techniques (methods and apparatus) for forming three-dimensional using data that has been modified to at least partially account for width of solidification of a beam used in forming laminae of the object.

A first aspect of the invention is to provide a method of forming a three-dimensional object from a plurality of adhered laminae by exposing successive layers of a medium to a beam of prescribed stimulation, including: (A) providing data representing a three-dimensional object; (B) manipulating the data to form modified object data for forming the three-dimensional object, including offsetting data associated with at one cross-sectional boundary to derive a desired compensated boundary that at least partially compensates for the width of solidification induced by the beam, wherein the compensated boundary is derived from at least a first offset value and a second offset value; (C) forming a layer of material adjacent to any last formed layer of material in preparation for forming a subsequent lamina of the object; (D) exposing the material to the beam of prescribed stimulation to form a successive lamina of the object; and (E) repeating the acts of forming and exposing a plurality of times in order to form the object from a plurality of adhered laminae.

A second aspect of the invention is to provide a method of forming a three-dimensional object from a plurality of adhered laminae by exposing successive layers of a medium to a beam of prescribed stimulation, including (A) providing data representing a three-dimensional object; (B) manipulating the data to form modified object data for forming the three-dimensional object, including offsetting data associated with at least some boundaries, to at least partially account for the width of solidification induced by the beam, by moving vertices of adjoining segments that form the boundaries inward by an amount dictated by a combination of (1) an angle formed by pairs of adjoining segments, and (2) a variable offset criteria that is based on at least two ranges of angles or is based on a variable offset criteria for at least one range of angles and two constant offset criteria for at least two ranges of angles; (C) forming a layer of material adjacent to any last formed layer of material in preparation for forming a subsequent lamina of the object; (D) exposing the material to the beam of prescribed stimulation to form a successive lamina of the object; and (E) repeating the acts of forming and exposing a plurality of times in order to form the object from a plurality of adhered laminae.

A third aspect of the invention is to provide a method of forming a three-dimensional object from a plurality of adhered laminae by exposing successive layers of a medium to a beam of prescribed stimulation, including (A) providing data representing a three-dimensional object; (B) manipulating the data to form modified object data for forming the three-dimensional object, which includes (B1)offsetting data associated with at least some boundaries, to at least partially account for the width of solidification induced by the beam, by moving vertices of adjoining segments that form the boundaries inward by an amount dictated by a combination of (1) an angle formed by pairs of adjoining segments, and (2) a predetermined offset criteria; and (B2) converting at least one original boundary segment into at least first and second offset boundary segments, when at least one of the vertices of the original boundary segment is not offset by an amount that maintains a proposed offset segment parallel to the original segment, such that the first offset segment remains parallel to the original segment and the second offset segment is not parallel to the original segment; (C) forming a layer of material adjacent to any last formed layer of material in preparation for forming a subsequent lamina of the object; (D) exposing the material to the beam of prescribed stimulation to form a successive lamina of the object; and (E) repeating the acts of forming and exposing a plurality of times in order to form the object from a plurality of adhered laminae.

Other aspects of the invention supply apparatus for implementing the method aspects of the invention noted above and provide computer programmed media containing instructions for manipulating the data as noted in the first through third aspects of the invention.

It is a feature of the present invention that vertices are moved by the data manipulation to compensate for calculated vertices' positions, instead of moving segments that form object boundaries, to prevent segments from crossing over each other.

It is another feature of the present invention that the vertices forming the object boundaries are moved one at a time and after each move, a check is made to ensure the topology of the object being formed has not changed and if so, the original vertex is not moved to the position of the new compensated or calculated vertex.

It is an advantage of the present invention that object features do not disappear in the three-dimensional object being formed by the data manipulation.

Additional aspects, features and advantages of the invention will be clear from the embodiments of the invention described below in conjunction with the Figures associated therewith. Further aspects of invention involve the practice of the above referred to aspects of the invention in various combinations with one another.

DESCRIPTION OF PREFERRED
EMBODIMENTS OF THE INVENTION

Figure 1A:
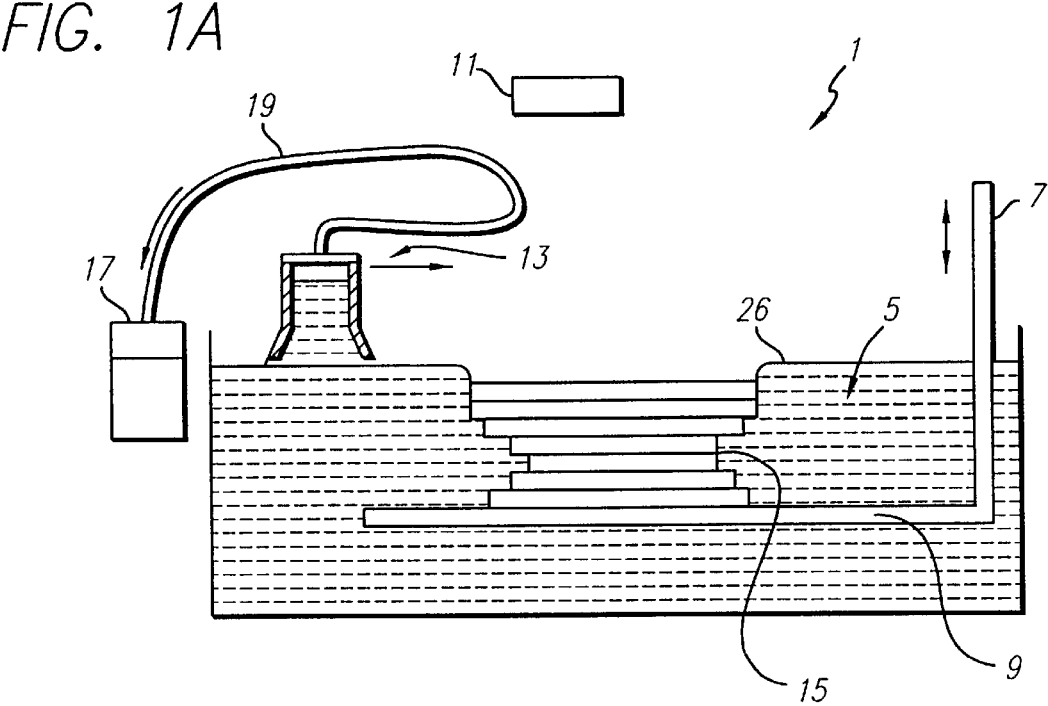
FIGS. 1a and 1b depict side views of a stereolithography apparatus for practicing the instant invention.
Figure 1B:
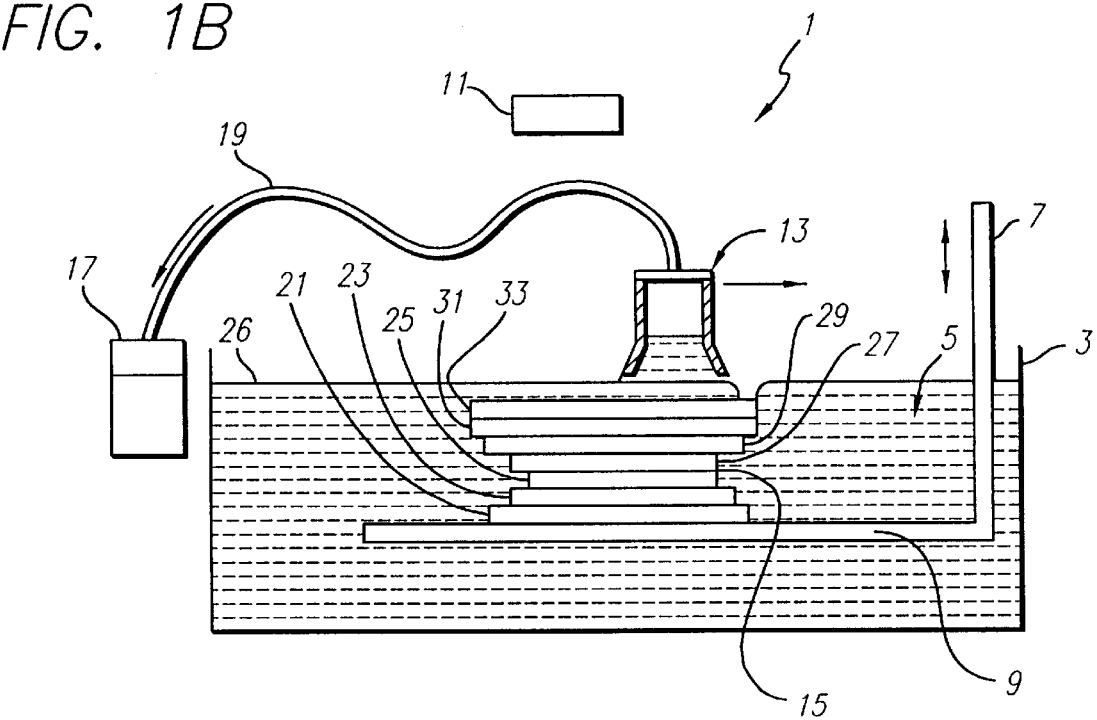

FIGS. 1a and 1b depict schematic representations of a preferred stereolithography apparatus 1 (SLA) system for use with the instant invention. The basic components of an SLA system are described in U.S. Pat. Nos. 4,575,330; 5,184,307; and 5,182,715 as referenced above. The preferred SLA system includes container 3 for holding building material 5 (e.g. photopolymer) from which object 15 will be formed, elevator 7 and driving means (not shown), elevator platform 9, exposure system 11, recoating bar 13 and driving means (not shown), at least one computer for manipulating object data (as needed) and for controlling the exposure system, elevator, and recoating devices.

A preferred scanning system is described in several of the patents referenced above including U.S. Pat. Nos. 5,058,988; 5,059,021; 5,123,734; 5,133,987; and 5,840,239. This preferred system includes the use of a laser, beam expander, and a pair of computer controlled XY rotatable scanning mirrors of either the motor driven or galvanometer type.

Preferred control and data manipulation systems and software are described in a number of the patents referenced above, including U.S. Pat. Nos. 5,184,307; 5,321,622; and 5,597,520.

A preferred recoating device is described in U.S. Pat. No. 5,902,537 to Almquist et al. as referenced above and includes recoater bar 13, regulated vacuum pump 17, and vacuum line 19 connecting the bar 13 and the pump 17.

Other components of a preferred SLA system (not shown) may include a liquid level control system, a build chamber, an environmental control system including a temperature control system, safety interlocks, a viewing device, and the like.

SLA systems on which the instant invention can be utilized are available from 3D Systems, Inc. of Valencia, Calif. These SLA systems include the SLA-250 using a HeCd laser operating at 325 nm, the SLA-3500 and SLA-5000 using a solid state laser operating at 355 nm, and the SLA-500 using an argon ion laser operating at 351 nm. Preferred building materials are photopolymer resins manufactured by CIBA Specialty Chemicals of Los Angeles, Calif., and are available from 3D Systems, Inc. These materials include SL 5170 for use with the SLA-250 system, SL 5190 for use with the SLA-350 and the SLA-5000 systems, and SL 5180 for use with the SLA-500 system.

The typical operation of an SLA system involves alternating formation of coatings of material (i.e. layers of material) and the selective solidification of those coatings to form an object from a plurality of adhered laminae. The process begins with the elevator platform 9 immersed one layer thickness below the upper surface 19 of the photopolymer 5. The coating of photopolymer is selectively exposed to a beam of prescribed stimulation (e.g. UV radiation) which cures the material to a desired depth to form an initial lamina of the object adhered to the elevator platform. This initial lamina corresponds to an initial cross-section of the object to be formed or corresponds to supports that may be used to adhere the object to the platform. After formation of this initial lamina, the elevator platform and adhered initial lamina are lowered a net amount of one layer thickness into the material. Hereinafter, layer thickness and other units of distance may be expressed in any of three units: (1) inches, (2) milli-inches (i.e. mils), or (3) millimeters . As the material is typically very viscous and the thickness of each layer is very thin (e.g. 4 mils to 10 mils), the material may not readily form a coating over the last solidified lamina. In the case where a coating is not readily formed, a recoating device may be swept across at or somewhat above the surface of the resin (i.e. work surface of the material) to aid in the formation of a fresh coating. The coating formation process may involve the sweeping of the recoating bar across the surface of the photopolymer resin medium one or more times at a desired velocity. After formation of this coating, the layer is solidified by a second exposure of the medium to prescribed stimulation according to data representing a second cross-section of the object. This process of coating formation and solidification is repeated over and over again until the object is formed from a plurality of adhered layers (21, 23, 25, 27, 29, 31, and 33).

In some building techniques, incomplete solidification of some or all object cross-sections may occur. Alternatively, in some processes an object lamina associated with a given layer (i.e. a lamina whose location should be positioned, relative to the rest of the object, at the level corresponding to that layer of photopolymer resin material) may not be exposed or may be only partially exposed in association with that layer (i.e. when that layer is located at the surface of the liquid). Instead, that lamina may be formed in whole or in part in association with a subsequently formed layer wherein the exposure applied to this subsequent layer is such as to cause material transformation to such an extent as to cause solidification in the material at the level of the associated cross-section. In other words, the layer that is associated with a given lamina may not be the layer in association with which the lamina will be solidified. It may be said that the layer in association with which a lamina or portion of a lamina is formed, is that layer which is located at the surface of material at the time it is solidified; while the layer with which a lamina is associated, is that layer which corresponds to the dimensionally correct location of the lamina relative to the rest of the object.

As noted previously, a need in the art exists for improved stereolithographic data manipulation techniques that yield improved compensation of boundary segments so as to more accurately form object cross-sections while maintaining small object features (features having a size equal to approximately the width of solidification induced by the beam or smaller).

In a preferred embodiment these manipulation techniques are based on the vector types as produced by the data conversion technique described in U.S. Pat. No. 5,321,622. According to the teachings in the '622 patent, the each cross-sectional portion of the object is defined by an initial cross-section boundary (ICSB). These ICSBs may be defined in several ways and may be derived in several ways. However defined, the ICSBs represent the undivided cross-sectional definition of each object cross-section. As such each segment of the ICSB may be considered to bound an object on one side and empty space (i.e. non-object) on the other side. In the first preferred embodiment of the instant invention the ICSBs are subjected to the compensation techniques, i.e. Line Width Compensation (LWC), prior to their being subdivided into other.boundaries and regions.

In this first preferred embodiment, after application of the LWC techniques, each cross-section will be divided into one, two or three different regions depending on the configurations of the successive cross-sections: (1) down-facing regions; (2) up-facing regions, and (3) continuing regions (i.e. regions that are neither down-facing nor up-facing). In forming the objects, the following eight vector types might be utilized though others may be defined and used:

| | |
|---|---|
| Down-facing boundaries | - Boundaries that surround down-facing regions of the object. |
| Up-facing boundaries | - Boundaries that surround up-facing regions of the object. |
| Continuing boundaries | - Boundaries that surround regions of the object that are neither up-facing nor down-facing |
| Down-facing Hatch | - Lines of exposure that are positioned within the down-facing boundaries. These lines may be closely or widely spaced from one another and they may extend in one or more directions. |
| Up-facing Hatch | - Lines of exposure that are positioned within the up-facing boundaries. These lines may be closely or widely spaced from one another and they may extend in one or more directions. |
| Continuing Hatch | - Lines of exposure that are positioned within continuing boundaries. These lines may be closely or widely spaced from one another and they may extend in one or more directions. |
| Down-facing Skin/Fill | - Lines of exposure which are positioned within the down-facing boundaries and closely spaced so as to form a continuous region of solidified material. |
| Up-facing Skin/Fill | - Lines of exposure which are positioned within the up-facing boundaries and closely spaced so as to form a continuous region of solidified material. |

Taken together, the down-facing boundaries, down-facing hatch and down-facing fill define the down-facing regions of the object. The up-facing boundaries, up-facing hatch, and up-facing fill, define the up-facing regions of the object. The continuing boundaries and continuing hatch define the continuing regions of the object. As down-facing regions have nothing below them to which adhesion is desirably achieved (other than may be supports), the quantity of exposure applied to these regions typically does not include an extra amount to cause adhesion to a lower lamina though extra laser beam exposure might be given to appropriately deal with any MSD issues that exist. As up-facing and continuing regions have solidified material located below them, the quantity of exposure applied to these regions typically includes an extra amount to ensure adhesion to a lower lamina. Since the solidification depth may be different for each of these regions in some embodiments it may be desirable to apply different amounts of compensation to the boundaries for each region.

Figure 2:
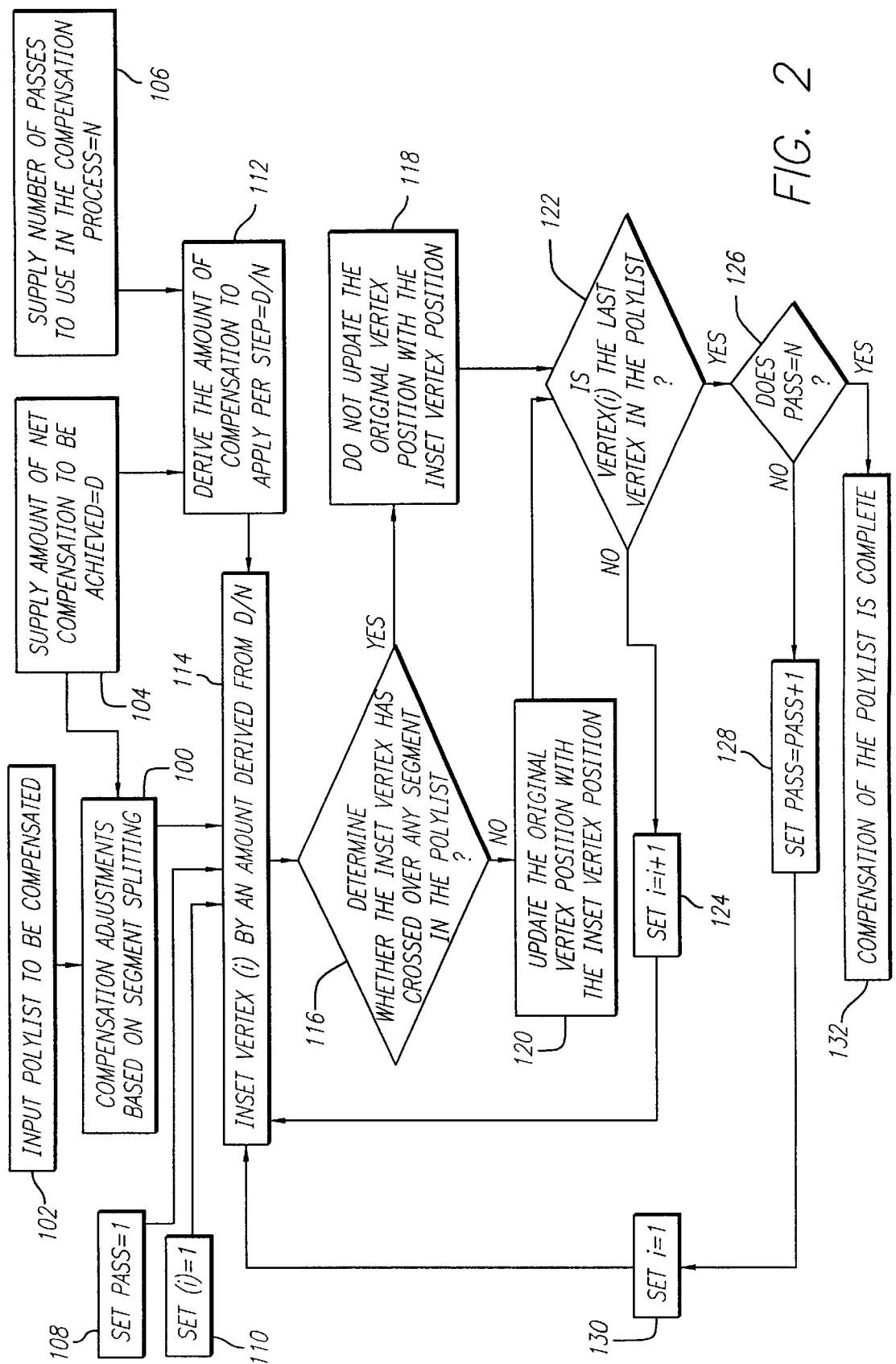
FIG. 2 is a flow chart depicting the process to be followed in a first preferred embodiment of the invention.

In the first preferred embodiment, the LWC technique is implemented according to the process indicated in the flowchart of FIG. 2 wherein the net desired segment offset is equal to D (e.g. approximately ½ the width of solidification induced by the laser beam).

Referring to FIG. 2, elements 102, 104 and 106 form the initial inputs for performing line width compensation according to a first preferred embodiment. Element 102 calls for inputting the polylist (e.g. group of boundary segments forming a closed loop) that are to be offset by the compensation routine.

Element 104 indicates that the net desired compensation amount is to be input. This compensation amount is not equal to the offset amount to be used in insetting the vertices, but instead reflects the desired amount of translation the boundary segments should undergo during the compensation. For various reasons, it should be understood that the net amount of compensation obtained for any segment may be different from this desired amount. This difference may arise due to limiting conditions placed on the movement of vertices. Such conditions might involve, for example, minimizing the risk of segment crossover. Of course in some alternatives, this amount may preexist in the system or may, for example, be derived manually by building and measuring sample objects. It may be derived automatically by, for example, measuring the profile of the beam and deriving an estimate of solidification width based on known properties of the building material.

Element 106 indicates that the number of passes, N, of compensation that will be used in achieving the net compensation amount, D, called for in element 104. As opposed to performing the compensation in a single pass, it is preferred to perform the compensation using a plurality of passes each of a smaller increment until the polylist has been compensated the entire or maximum amount possible. The latter is a possibility in the event an object, such as a polygon, cannot be fully compensated. Breaking the compensation process up into a plurality of passes increases the likelihood of making compensations that retain the original configuration of small object features. In one preferred embodiment N, the number of passes, is set equal to four. In other embodiments N may be two, three, five, or even more. For better retention of small features the value of N should be set as high as possible. On the other hand, the higher the value of N, the more time the processing will take. The actual value of N may depend on the value of D. The larger D is, the higher N must be in order to ensure the retention of the shape of small features of a given size. For example, if it is desired that the relative shape of small features will substantially be held within a tolerance, 2T, then it is preferred that N be equal to or greater than D/T. By use of this value for N it is ensured that no single pass through the compensation routine will cause a change in relative shape by an amount substantially greater than 2T. Of course if the solidification depth is relatively constant, or tolerance requirements are not too strict, a fixed value of N may be utilized and even hard coded into any software that is used in implementing the process. As with D, N may be determined manually or automatically based on solidification width estimates and on tolerance requirements.

Element 108 sets the variable "pass" at a value of one as a starting point for the process. Element 110 set the variable "i" at one so that the process starts with the first vertex in the polylist being compensated.

Element 100 calls for splitting selected segments of the polylist into two or more sub-segments such that one of the sub-segments upon compensation will substantially retain its parallel orientation with the original segment while another sub-segment, upon compensation, will not retain its parallel orientation with the original segment. The sub-segment that does not retain its parallel orientation may result from a feature that is too small (e.g. smaller than approximately double the net desired compensation amount D) or may result from an avoiding too large of an offset of a vertex point that is associated with an angle greater than 90° though the associated feature may not be too small. In other words, by dividing the original segment into multiple sub-segments it is possible to obtain better compensation than that allowed by simply offsetting the vertices of the original boundary loop. In use of this technique it is possible to offset a portion of a boundary an optimal amount while retaining the parallel relationship between that portion and the original boundary and while simultaneously ensuring that small features are not excessively eliminated. By checking that each offset or moving of the vertices does not change the topology of the object being formed, the elimination of small features can be avoided.

Figure 3A:
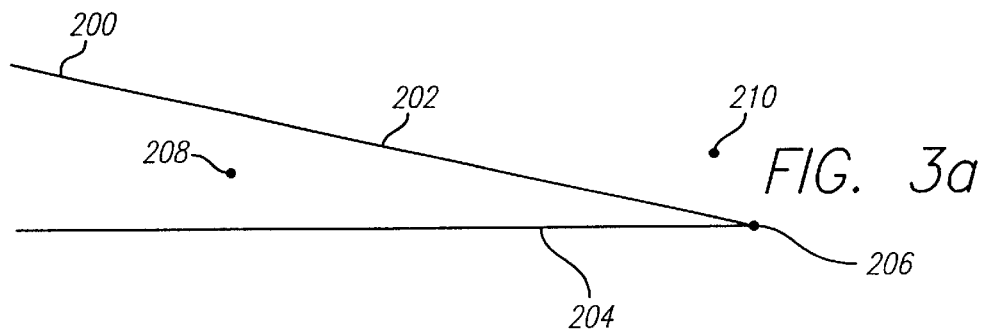
FIGS. 3a–3c provide an example of splitting segments around a vertex having an acute angle.

FIGS. 3a–3c and 4a–4d provide examples of segment splitting. FIG. 3a depicts a portion of a boundary 200 formed by segments 202 and 204 which meet at vertex 206. The object portion occupies region 208 and the non-object portion exists in region 210.

Figure 3B:
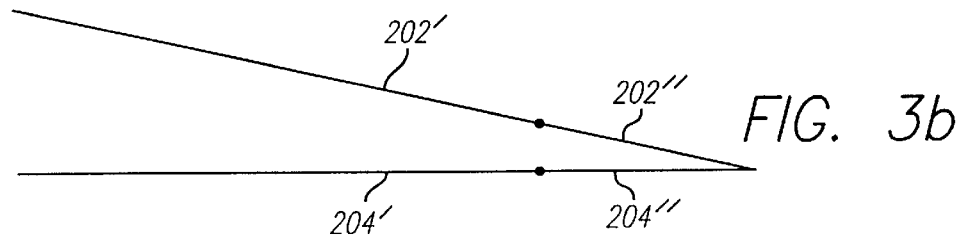

FIG. 3b depicts the same portion of the boundary where segment 202 has been split into sub-segments 202' and 202" and segment 204 has been split into sub-segments 204' and 204".

Figure 3C:
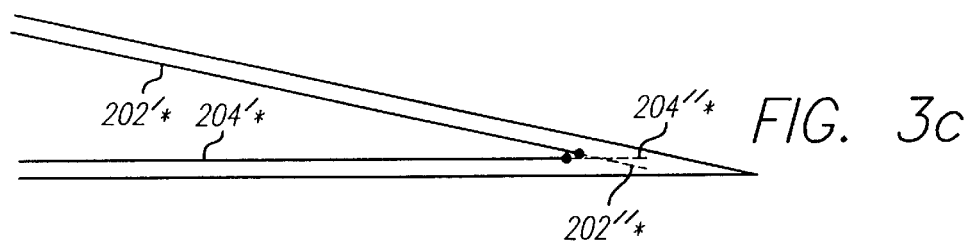

FIG. 3c depicts the boundary portion after offsetting wherein it is shown that offset sub-segments 202'* and 204'* remain parallel to their originating segments 202' and 204', respectively, while sub-segments 202"* and 204"* do not retain this parallel quality.

Figure 4A:
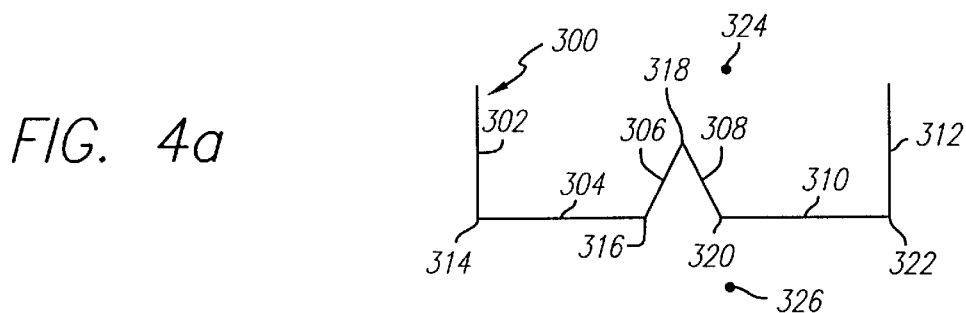
FIGS. 4a–4c provide an example of splitting segments around a vertex having an angle greater than 180°.

FIG. 4a depicts a portion of a boundary 300 formed by segments 302, 304, 306, 308, 310, and 312 which meet at vertices 314, 316, 318, 320, and 322. The object portion occupies region 324 and the non-object portion exists in region 326.

Figure 4B:
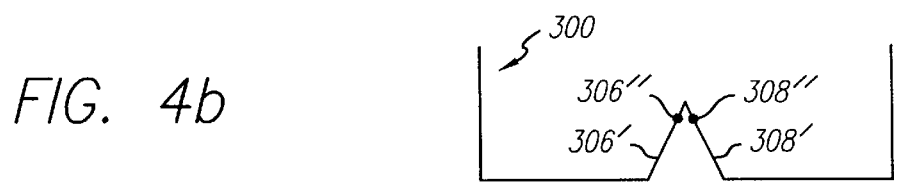

FIG. 4b depicts the same portion of the boundary where segment 306 has been split into sub-segments 306' and 306" and segment 308 has been split into sub-segments 308' and 308".

Figure 4C:
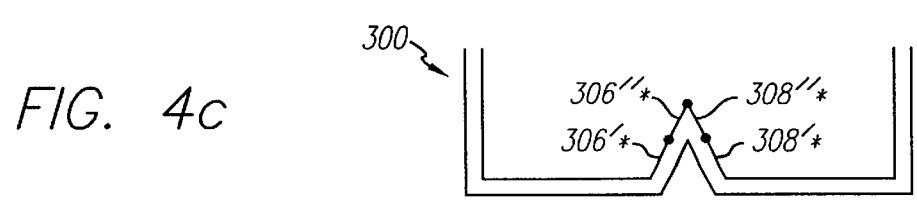

FIG. 4c depicts the boundary portion after offsetting wherein it is shown that offset sub-segments 306'* and 308'* remain parallel to their originating segments 306' and 308'*, respectively, while sub-segments 306"* and 308"* do not retain this parallel quality.

Various ways exist for splitting the compensated segments or alternatively worded, for establishing one or more new vertex points between otherwise successive vertex points. A preferred technique will be described herein next.

In a preferred technique a "required distance" is determined based on ranges of vertex angles. Required distances may be empirically determined for a given laser beam diameter and set of representatives shapes to be formed. Table 2 provides a sample set of relationships between vertex angle and required distance.

TABLE 2

Relationships between various vertex angles (θ) and required distances for insert split points

| Vertex Angle | Required Distance |
| --- | --- |
| $\theta =< \theta_1$ | $2*D + \tan(\theta/2)$ |
| $\theta_1 < \theta =< \theta_2$ | 0 |
| $\theta_2 < \theta < \theta_3$ | $0.5*D$ |
| $>= \theta_3$ | $0.1*D$ |

In this example, break points of $\theta_1=70°, \theta_2=220°$, and $\theta_3=290°$ are preferred. In other embodiments other break points, more ranges, fewer ranges, and/or the required distances may be varied.

Once the required distance for a given vertex is determined, that distance is compared to each of the two segments containing the vertex. If the length of the segment is less than the required distance, no point is inserted. If the required distance is less than the segment length a point may be inserted that will be used to divide the segment into two pieces. The point is inserted along the respective segment at a length from the vertex that is substantially equal to the required distance. This process is repeated for each vertex based on the updated segments touching each respective vertex.

Element 112 calls for derivation of the compensation amount to be used per pass. This amount may be considered the "step amount" of compensation as opposed to the net amount of compensation. In this example, this amount is set equal to the quotient of D divided by N. In alternative embodiments it is possible to derive this amount in other ways where the net compensation would still be substantially equal to b but the amount of compensation per step would vary from step to step. In particular it might be advantageous to use a scheme that reduces the size of the compensation with successive passes.

Step 114 calls for the insetting of a first vertex of the polylist supplied in element 102. This insetting is based on the step amount derived in element 112. The amount of vertex inset is not necessarily equal to the step amount. But the amount of inset is based on the step amount, as well as other factors.

In one preferred embodiment the amount of inset is based on the step amount in combination with the angle formed by the boundary segments forming the polygons. The vertex inset amount may be set equal to $(D/N)/[(1-\cos \theta)/2)]^{1/2}$ or alternatively expressed $(D/N)\sin(\theta/2)$.

In another preferred embodiment, the inset amount may be based on ranges of angles. There may be two or more ranges defined, wherein the offset amount may be a constant within the range or may be a variable. Table 3 provides an example of such ranges in tabular format. In this example break points of the ranges may be $\theta_1=15°$, $\theta_2=70°$, and $\theta_3=290°$. Of course other break points are possible. There may be fewer break points or more break points. In any range the inset amount may be based a constant, or a variable. It is preferred that the inset amount be a constant, or substantially a constant, for the smallest range of angles and that it be a constant, or substantially a constant, for the largest range of angles. It is also preferred that there be at least one range in between the largest and smallest where the inset amount varies depending on angle.

TABLE 3

Relationships between various vertex angles and desired amount of inset per pass of compensation

| Vertex Angle (θ) Measured through the object as opposed to through the non-object region | Inset amount |
|---|---|
| θ =< $\theta_1$ | Use an inset amount = D/N |
| $\theta_1$ < θ =< $\theta_2$ | Use an inset amount equal to a linearly interpolated value between (D/N)/[sin($\theta_1$/2)] and (D/N)/[sin($\theta_2$/2)]. |
| $\theta_2$ < θ < $\theta_3$ | Use inset = (D/N)/[sin(θ/2)] |
| >= $\theta_3$ | Use inset = (D/N)/[sin($\theta_4$/2)] |

In step element 116, the inset vertex is checked to determine whether it crossed over any segment in the polylist. If no crossover occurs (element 120) the position of the vertex is updated to the inset position. If a crossover is detected (element 118) the original vertex position is not updated. In performing this check, it may be desirable to use an inset amount somewhat greater than that actually desired (e.g. greater than that derived from the above noted equations or from Table 2) so as to provide extra confidence that no cross-over will occur once all vertices in the polylist have been moved. This extra amount may be a small amount compared to the desired inset amount or may be as much as two times the desired inset amount, or even more. The comparison may be based on segment positions in the original polylist or on segment positions that have been modified based on new vertex positions accepted during the compensation process.

In step 122, a determination is made as to whether vertex (i) is the last vertex in the polylist. If it is not (element 124), "i" is incremented by one and the process loops back to element 114 for the next vertex. If it is the last vertex in the polylist (element 126), a determination is made as to whether or not all N passes of compensation have been made. If all N passes have not been made (element 128), "pass" is incremented by one, "i" is reset to one (element 130), and the process is looped back to element 114.

If all N passes have been made, the process of compensating the boundary loop is complete (element 132). The entire process may be repeated for other boundary loops on the same cross-section or used for boundary loops on subsequent cross-sections to be processed.

In alternative embodiments the segment split technique and the multiple passes of compensation may be practiced independently, the segment splitting technique may be implemented after compensation passes, or may be intermixed with one or more passes.

A preferred implementation of the line width compensation using all of the techniques of multiple passes, angle ranges, and segment splitting can be accomplished, for example, using source code written in the C++ programming language. This approach can employ two separate pieces along with three header files: (1) Main Code—Calling for execution of beam width compensation routines (i.e. line width compensation routines), (2) Beamcomp.cpp— providing primary routines for performing line width compensation, (3) Plistmap.h—one of the header files called for by Beamcomp.cpp, (4) BeamComp.h—another header file called for by Beamcomp.cpp, and (5) Polyalgs.h—a further header file called for by Beamcomp.cpp.

Remaining data to be used in forming a three-dimensional object may be derived according to the teachings of the above noted patents and applications. For example, the teachings of the '622 patent may be utilized.

Alternative embodiments might use other forms of region identification and vector type creation. Examples of such alternatives are described in various patents is and applications referenced above, including U.S. Pat. Nos. 5,184,307; 5,209,878; 5,238,639; 5,597,520; 5,943,235; and Application Ser. No. 08/855,125. Some schemes might involve the use of fewer designations such as: (1) defining only outward facing regions and continuing regions where down-facing and up-facing regions are combined to form the outward facing regions; (2) combining all fill types into a single designation; or (3) combining up-facing and continuing hatch into a single designation or even all three hatch types into a single designations. Other schemes might involve the use of more designations such as dividing one or both of the up-facing and down-facing regions into flat regions and near-flat regions.

Other region identifications might involve the identification of which portions of boundaries regions associated with each lamina are outward facing and/or interior to the lamina. Outward facing boundary regions are associated with the Initial Cross-Section Boundaries (i.e. the cross-sectional boundary regions existing prior to dividing them into down-facing, up-facing, and continuing boundary regions) described in U.S. Pat. Nos. 5,321,622 and 5,597,520. Interior boundaries are bounded on both sides by object portions of the lamina whereas outward boundaries are bounded on one side by an object portion of the lamina and on the other side by a non-object portion of the lamina.

The starting point for implementation of the instant invention need not be the data associated with a strict layer-by-layer building process. The starting point may be initial or modified three-dimensional object data that has not yet been converted to cross-sectional data. Furthermore, it may be modified cross-sectional data descriptive of laminae that will not be formed on a strict layer-by-layer basis. For example, the starting point may be surface or cross-sectional data that has been modified to accommodate for an MSD and/or MRD that is greater than one layer thickness.

Implementation of the methods described herein to form apparatus for forming objects according to the teachings herein can be implemented by programming an SLA system control computer, or separate data processing computer, through software or hard coding to manipulate the data associated with the object.

The methods and apparatus in these embodiments and their alternatives can be modified according to various teachings in the above incorporated patents and applications. Examples of such modifications include: (1) Forming objects upside down instead of right side up; (2) using oversized, undersized or other sizing styles; (3) using data interpolation techniques; (4) using trapped volume or other features identifications; (5) using other vector types; (6) using multiple skinning layers; (7) using multiple offset boundaries; (8) using other recoating techniques like a counter rotating roller, ink jet dispensers, a rigid or flexible doctor blade, a brush; and (9) the like.

It is believed that the teachings herein can be applied to other RP&M technologies in order to achieve enhance cross-sectional accuracy while simultaneous ensuring retention of small object features.

Though particular embodiments have been described and illustrated and many alternatives proposed, many additional embodiments and alternatives will be apparent to those of skill in the art upon review of the teachings herein. As such, these embodiments are not intended to limit the scope of the invention, but instead to be exemplary in nature.

What is claimed is:

1. A method of forming a three-dimensional object from a plurality of adhered laminae by exposing successive layers of a medium to a beam of prescribed stimulation, comprising:

providing data representing a three-dimensional object;

manipulating the data to form modified object data for forming the three-dimensional object, including offsetting data associated with at least some boundaries, to at least partially account for the width of solidification induced by the beam, by moving vertices of adjoining segments that form the boundaries inward by an amount dictated by a combination of (1) an angle formed by pairs of adjoining segments, and (2) a variable offset criteria that is based on at least three ranges of angles or is based on a variable offset criteria for at least one range of angles and two constant offset criteria for at least three ranges of angles;

forming a layer of material adjacent to any last formed layer of material in preparation for forming a subsequent lamina of the object;

exposing the material to the beam of prescribed stimulation to form a successive lamina of the object; and repeating the acts of forming and exposing a plurality of times in order to from the object from a plurality of adhered laminae.

2. The method of claim 1 additionally including a fourth range of angles.

3. The method of claim 2 wherein the third range of angles extends from substantially zero degrees to a first angle and the fourth range of angles extends from a second angle, which is greater than the first angle, up to substantially 360°.

4. An apparatus for forming a three-dimensional object from a plurality of adhered laminae by exposing successive layers of a medium to a beam of prescribed stimulation, comprising:

means for receiving data representing a three-dimensional object;

means for manipulating the data to form modified object data for forming the three-dimensional object, including offsetting data associated with at least some boundaries, to at least partially account for the width of solidification induced by the beam, by moving vertices of adjoining segments that form the boundaries inward by an amount dictated by a combination of (1) an angle formed by pairs of adjoining segments, and (2) a variable offset criteria that is based on at least three ranges of angles or is based on a variable offset criteria for at least one range of angles and two constant offset criteria for at least three ranges of angles;

means for forming a layer of material adjacent to any last formed layer of material in preparation for forming a subsequent lamina of the object;

means for exposing the material to the beam of prescribed stimulation to form a successive lamina of the object; and means for repeatedly operating the means for forming and the means for exposing a plurality of times in order to form the object from a plurality of adhered laminae.

* * * * *